United States Patent

[11] 3,600,824

| [72] | Inventor | Lafayette A. Robinson |
| | | 302 Clinton Ave., Brooklyn, N.Y. 11205 |
| [21] | Appl. No. | 841,232 |
| [22] | Filed | July 14, 1969 |
| [45] | Patented | Aug. 24, 1971 |

[54] EDUCATIONAL QUESTION AND ANSWER CARD-READING APPARATUS
7 Claims, 6 Drawing Figs.

| [52] | U.S. Cl. | 35/9 R |
| [51] | Int. Cl. | G09b 7/06 |
| [50] | Field of Search | 35/9, 9 A, 48 A, 48 B |

[56] References Cited
UNITED STATES PATENTS

| 2,720,038 | 10/1955 | Clark | 35/9 |
| 3,003,259 | 10/1961 | Sullivan | 35/48 |
| 3,100,352 | 8/1963 | Boissevain | 35/9 |
| 3,214,847 | 11/1965 | Dorsett et al. | 35/9 |

Primary Examiner—Wm. H. Grieb
Attorney—Polachek & Saulsbury

ABSTRACT: An educational question and answer card-reading apparatus includes a data card which has a multiplicity of questions with a plurality of answers for each on one side of the card. On the other side is a printed circuit with groups of conductive elements arranged to correspond with correct and incorrect answers for each question. The card fits into a card-reading device which has a question selector electrically bridging the conductive elements with conductive rails in the device. The rails are connected in circuit with correct and incorrect answer lamps and with answer-selecting pushbutton switches. Both the answers and printed circuitry may be applied to both sides of the data card. The printed circuit may be concealed or obscured by a layer of plastic, ink or other means so that the pattern of the circuit is not apparent.

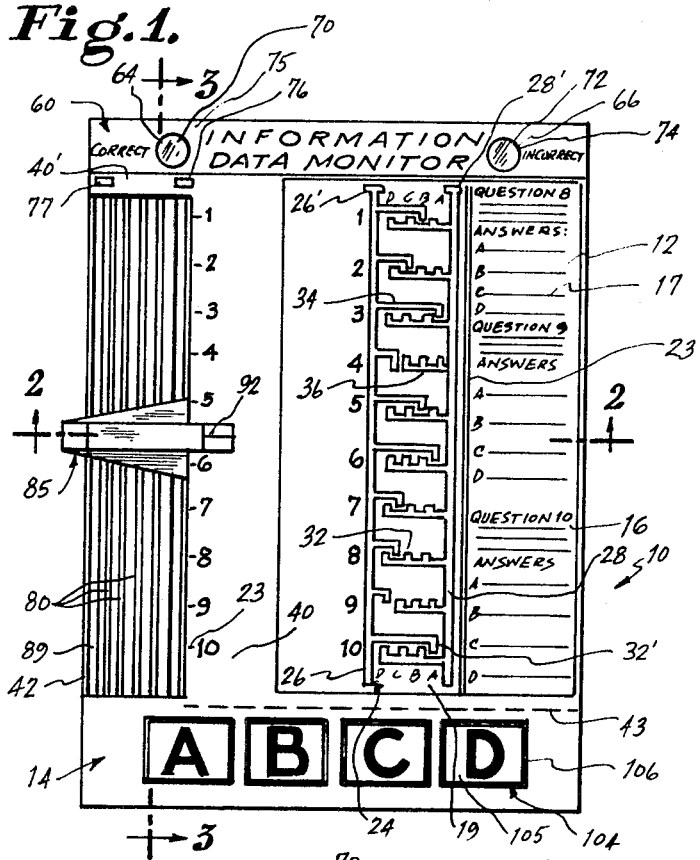
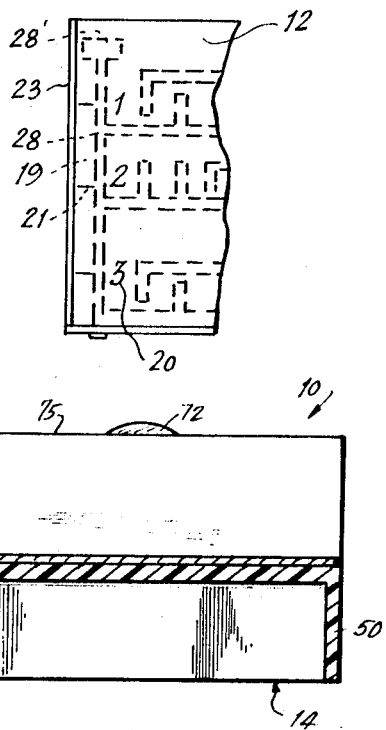
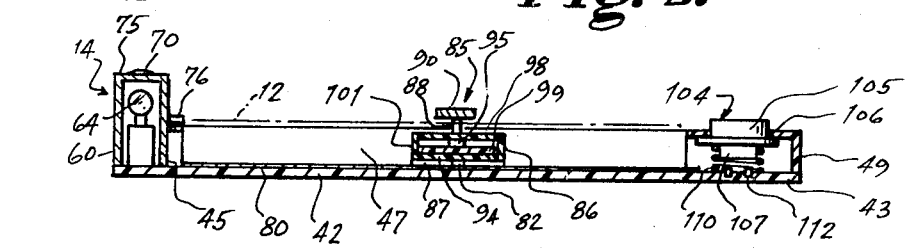

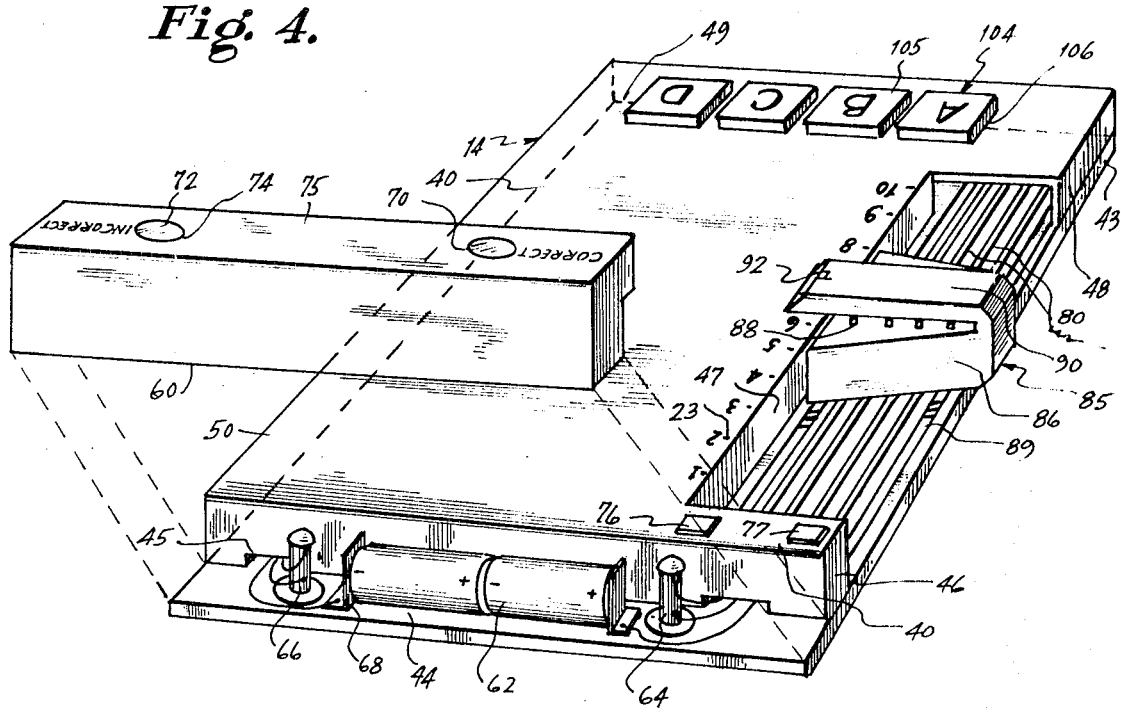

EDUCATIONAL QUESTION AND ANSWER CARD-READING APPARATUS

The present invention relates to an educational apparatus and more particularly concerns a data card-reading device which responds to a choice of data conductively printed on a data card.

Heretofore automatic devices used for teaching, learning, scoring and testing in the educational field have been generally complex in construction, expensive to manufacture, and difficult to keep in working order. Some have required rather large power sources to operate which limits their portability, presents a safety hazard and increases cost, size, weight and complexity.

The present invention is directed at educational apparatus which includes a data card or sheet and an associated data-reading device in which the card or sheet is inserted for checking and indicating a learner's correct and incorrect responses. The data card or sheet may have on one side a multiplicity of numbered questions with multiple choice answers. A student can study the card and mentally make note of the correct and incorrect answers. At one margin of the card is a series of numbers corresponding to the numbers of the questions. On the opposite side of the card is a conductively printed circuit with conductive elements representing all possible correct and incorrect answers to the questions. After study of the card the student inserts it into the data checking device.

The data reading device has circuitry including pushbutton switches operable by the student. Connected in circuit with the switches is a battery power supply, a correct answer lamp, incorrect answer lamp, and question selector. The printed circuit on the card completes the circuitry of the data-reading device. A plurality of conductive rails are provided in the device along which the question selector moves. The question selector includes a question pointer and a plurality of contacts which electrically interconnect the rails with conductive elements on the data card at each numbered question position. The question selector can be moved along the card to each numbered question position. When the student presses any one of the pushbuttons, either the correct or incorrect answer lamp lights up to indicate a correct or incorrect answer to the particular question selected for answer.

The invention will be explained in further detail in connection with the drawing, wherein:

FIG. 1 is a plan view of a data-reading device embodying the invention with a data card mounted thereon but turned back to show the arrangement of the circuit on the card.

FIG. 2 is an enlarged cross-sectional view taken on line 2—2 of FIG. 1, the data card being shown disposed in operative position.

FIG. 3 is a longitudinal sectional view taken on line 3—3 of FIG. 1, the data card being omitted.

FIG. 4 is a perspective view of the device of FIGS. 1-3, the data card being omitted, with a lamp and battery cover shown separated from the device.

FIG. 5 is a diagram of the electric circuit of the device.

FIG. 6 is a plan view of a corner portion of a data card.

Referring first to FIGS. 1-4, there is shown apparatus 10 including data card 12 and data card-reading device 14. The data card is an insulative rectangular flexible sheet with a multiplicity of numbered questions 16 and multiple choice answers 17 printed on its upper side. Along one margin 19 is a series of numerals 20 corresponding to the numbers of the questions 16 (see FIG. 6). An index line 21 is located at edge 23 adjacent each numeral 20. On the underside of the card at margin 19 is a printed circuit 24 including two-spaced conductive stripes 26,28 extending parallel to each other end and to edge 23 lengthwise or vertically of the card or sheet 12. A plurality of groups of conductive elements 32 are disposed in a column between parallel vertical stripes 26,28. One conductive element in each group is connected via a transversely extending conductive stripe 34 to stripe 26. The remaining conductive elements of the group are connected via a transversely extending conductive stripe 36 to stripe 28. The elements 32 in each group are arranged in a horizontal row between the vertical stripes 26,28 and are equally spaced apart. Four elements 32 are shown in each group, but it is possible that more can be provided if more answers 17 are printed on the upper side of the card. The elements 32 in each group correspond to answers 17 designated "A," "B," "C" and "D," respectively.

Device 14 includes a horizontal platform 40, marginal side base plate 42 and end base plates 43,44. Narrow vertical walls or flanges 45–50 connect the platform to the base and end plates. A hood or cover 60 removably fits over end plate 44 to enclose batteries 62 and lamps 64,66. The batteries are held by spring brackets 68. The lamps are spaced apart and are disposed under green and red colored lenses 70,72, respectively, mounted in openings 74 in top wall 75 of the cover.

Platform 40 has a lateral extension 40' on which is a pair of spaced metal contacts 76,77 disposed to be contacted by conductive elements 26', 28' located at one end of stripes 26,28 at the underside of card 12.

On base plate 42 is a group of four stationary rails 80. On these rails ride slidable contacts 82 carried by question selector 85. The question selector has a lower plastic body portion 86 formed with dovetailed feet 87 which are slidably engaged in dovetailed grooves 89 in base plate 42. An index pointer bar 90 overlays the lower tapered body portion 86 and extends laterally over the left margin of platform 40 as clearly shown in FIG. 1. Index line 92 on bar 90 can be aligned with index lines 23 at the left edge of platform 40, and with index lines 21 on card 12 when the left margin of the card is inserted under the bar as shown in FIG. 2. Bar 90 can be made of transparent material to facilitate aligning line 92 with index lines 21. Contacts 82 are set in horizontal web 94 at the bottom of body portion 86. The contacts are tubular and receive contact pins 88 vertically disposed and axially slidable in contacts 82. Fins 88 extend through holes in upper horizontal web 98. Annular flanges 95 on the pins keep them from coming out of the holes in web 98. A sponge rubber or plastic pad 99 is disposed in a chamber 101 defined between webs 94 and 98 and resiliently urges the pins 88 upwardly to contact conductive elements 32 at the underside of card 12.

At end 49 of the platform is a group of four pushbutton switches 104. Each switch has a pushbutton 105 slidably disposed in a hole 106 in the platform. Each pushbutton has a conductive bar 107 elevated by a coil spring 110 above two stationary contacts 112 on end base plate 43. The switches 104, rails 80, lamps 64,66, batteries 62 and contacts 76,77 are connected in an electric circuit 100 shown in FIG. 5 to which reference is now made.

It will be noted in FIG. 5 that card 12 forms part of circuit 100. In circuit 100, terminal 120 of the batteries 62 is connected to one terminal of each of lamps 64,66. The other terminals of the lamps are connected to stationary contacts 76,77, respectively. Lamp 64 is the green or correct answer lamp. Lamp 66 is the red or incorrect answer lamp. Contacts 76 and 77 are contacted by conductive elements 26' and 28', respectively, when card 12 is properly inserted in the device. Pins 88 contact conductive elements 32 connected via stripes 34 and 36 to stripes 26,28, respectively.

Contacts 82 slide along rails 80 which are connected via wires 124 to one contact of each pair of stationary contacts 112 of switches 104. Each pushbutton 105 advances bar 107 to close one switch by bridging contacts 112. Wire 126 connects the other contact of each pair of contacts 112 to terminal 121 of the batteries 62.

In use of the apparatus, a student will study card 12 and learn the answers to as many questions 16 as he can. As many different cards with different questions and different answers can be provided as desired. Cards can be constructed with more or less than 10 questions and 10 corresponding groups of contact elements 32 on the card. The student can then insert the card 12 which he has been studying into device 14. The left margin of the card will be located under bar 90 as shown in FIG. 2. Conductive elements 26',28' will contact contacts 76,77, respectively. The card will lie flat on the platform 40 with its edges parallel to the edges of the platform. The student will move the question selector 85 to the desired question position. He will then press any one of the lettered pushbuttons 105 corresponding to the selected lettered answer of a question.

Suppose the student is answering question 010 indicated in FIG. 1. It will be noted that conductive element 32' is in the A column and this contact is connected via stripe 34 to stripe 26. If the student presses pushbutton "A," the green light indicating the answer is correct will appear at lens 70 because the lamp 64 will light. If the student pushes any of the other three pushbuttons the incorrect answer will light appear at lens 72 because lamp 66 will light. By the arrangement described, the student can check himself to ascertain whether or not he has learned the answers to the questions correctly and which answer is correct. The device thus can act as a self-teaching and self-testing means.

The device described is relatively simple in construction, light in weight, easily portable, simple to use, and entirely safe because low voltage batteries are employed. The apparatus will meet a long felt need in the educational field for a teaching aid which can be widely distributed at low cost.

Although a preferred embodiment has been disclosed, various modifications are possible in the device as described above. For example, both the answers and printed circuitry may be applied to both sides of the date card. The printed circuit may be concealed or obscured by a layer of plastic, ink or other means so that the pattern of the circuit is not apparent.

For further use of the data card for educational purposes, the student can mark the correct or selected answers 17 on the card. The marked answers will then be checked out when inserted into the card reading device by moving question selector 85 to each question in turn and pressing one of pushbuttons 105 corresponding to the marked answer. This will cause lamp 64 or lamp 66 to light. If more or less than four answers per question are provided on card 12, more or less pushbuttons 105, switches 104, contacts 112 and rails 80 will be provided accordingly.

Although a preferred embodiment of the invention has been described and illustrated, it will be apparent that many modifications and variations are possible without departing from the invention.

What I claim is:

1. Educational apparatus for reading a data card having thereon a multiplicity of questions with a plurality of designated answers for each question, and having groups of conductive elements disposed in spaced array in a column longitudinally of one margin of the card, each element in each group corresponding to a designated answer to one of the questions, said apparatus comprising a flat rectangular support for said card; a selector device movable along a marginal portion of said support through a plurality of data-reading positions in slidable engagement with said one margin of the card; a plurality of conductive rails disposed on said marginal portion of the support; contact members carried by said selector device and arranged to contact simultaneously the conductive elements in one of said groups and the rails so that each rail is in direct electric circuit with one of said conductive elements at each of the data reading positions; a plurality of switches on said support connected in circuit with said rails respectively; power supply means carried by said support; and two indicating devices connected in circuit with said power supply means, one of said indicating devices being arranged to provide a correct answer indication when one of said switches which is in circuit with a particular one of the conductive elements in a group thereof is closed, the other of said indicating devices being arranged to provide an incorrect answer indication when any other one of the switches which is in circuit with any of the other conductive elements in said one group is closed.

2. Apparatus as defined by claim 1, wherein the indicating devices are lamps providing visible correct answer indications.

3. Apparatus as defined by claim 1, wherein the power supply means comprises at least one battery so that the power supply for said circuit is carried entirely by said support.

4. Apparatus as defined by claim 1, wherein said data card has two parallel conductive stripes extending longitudinally of said one margin of the card and disposed laterally of opposite ends of said groups of conductive elements, and other conductive stripes connecting the conductive elements in each group thereof to said two stripes, said apparatus further comprising two electrical contacts on said support disposed to contact said two conductive stripes respectively, said two electrical contacts being connected in circuit with the indicating devices respectively so that the same are energized by said power supply means via said two conductive stripes and said two electrical contacts respectively.

5. Apparatus as defined by claim 1, wherein the selector device comprises a lower body slidably engaged with said marginal portion of the support; a pointer bar overlaying said lower body to bear on said one margin of the card; and resilient means in said lower body urging said contact members upwardly toward said pointer bar to slidably engage the conductive elements on said data card, said indicating devices being lamps providing visible correct answer and incorrect answer indications, and wherein said power supply means comprises at least one battery.

6. Apparatus as defined by claim 5, wherein said data card has two parallel conductive stripes extending longitudinally of said one margin of the card and disposed laterally of opposite ends of said groups of conductive elements, and other conductive stripes connecting the conductive elements in each group thereof to said two stripes; said apparatus further comprising two electrical contacts on said support disposed to contact said two conductive stripes respectively, said two electrical contacts being connected in circuit with the indicating devices respectively, so that the same are energized by said power supply means via said two conductive stripes and said two electrical contacts respectively.

7. Educational apparatus comprising a flexible insulative rectangular data card adapted for being read in a data-reading device, said card having a multiplicity of questions thereon with a plurality of designated answers for each question; an electric circuit on the card comprising a plurality of groups of conductive elements, the elements in each group thereof corresponding respectively to the several answers of a different one of the questions, said groups being disposed in transverse rows and spaced apart longitudinally in a column along the card, and spaced conductive stripes extending longitudinally of the card and connected by transverse stripes to certain ones of the conductive elements in each group thereof, said groups of elements being located between the stripes.